United States Patent
Albrecht

(10) Patent No.: US 7,492,540 B2
(45) Date of Patent: Feb. 17, 2009

(54) APPARATUS SYSTEM AND METHOD FOR VARIABLE DATA DENSITY PATTERNED MEDIA

(75) Inventor: Thomas R. Albrecht, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 70 days.

(21) Appl. No.: 11/532,373

(22) Filed: Sep. 15, 2006

(65) Prior Publication Data
US 2008/0068754 A1    Mar. 20, 2008

(51) Int. Cl.
*G11B 5/09* (2006.01)
(52) U.S. Cl. ............................ 360/51; 360/48; 360/53; 369/47.22
(58) Field of Classification Search ................ None
See application file for complete search history.

(56) References Cited

U.S. PATENT DOCUMENTS

| | | | | |
|---|---|---|---|---|
| 4,188,646 A * | 2/1980 | Sordello et al. | ........... | 360/77.08 |
| 4,549,232 A * | 10/1985 | Axmear et al. | ........... | 360/77.07 |
| 5,371,722 A * | 12/1994 | Yoshimura et al. | ........ | 369/13.02 |
| 5,820,769 A * | 10/1998 | Chou | ........................... | 216/22 |
| 6,072,650 A | 6/2000 | Wilson | ........................ | 360/51 |
| 6,162,532 A * | 12/2000 | Black et al. | .................. | 428/323 |
| 6,421,195 B1 * | 7/2002 | Rubin et al. | ................... | 360/48 |
| 6,440,520 B1 * | 8/2002 | Baglin et al. | ............. | 428/847.7 |
| 6,515,813 B2 | 2/2003 | Kitazaki et al. | ................ | 360/51 |
| 6,611,391 B1 | 8/2003 | Murphy et al. | ............... | 360/50 |
| 6,628,598 B2 * | 9/2003 | Edwards et al. | ................ | 369/99 |
| 6,654,324 B1 | 11/2003 | Huber et al. | ............. | 369/47.28 |
| 6,738,207 B1 * | 5/2004 | Belser et al. | ................... | 360/31 |
| 6,754,016 B2 * | 6/2004 | Messner et al. | ................ | 360/48 |
| 6,809,998 B2 * | 10/2004 | Nagata | ..................... | 369/47.22 |
| 6,882,487 B2 | 4/2005 | Hanson et al. | ................ | 360/51 |
| 6,906,879 B1 * | 6/2005 | Albrecht et al. | ............... | 360/55 |
| 6,920,004 B1 | 7/2005 | Codilian et al. | ............... | 360/51 |
| 6,977,108 B2 * | 12/2005 | Hieda et al. | ................. | 428/64.2 |
| 6,996,053 B2 * | 2/2006 | Nakamura et al. | ........ | 369/275.3 |
| 7,019,805 B2 * | 3/2006 | Kim et al. | .................... | 349/129 |
| 7,019,924 B2 * | 3/2006 | McNeil et al. | ................ | 360/48 |
| 7,019,925 B2 * | 3/2006 | Ehrlich | ........................ | 360/48 |
| 7,050,251 B2 * | 5/2006 | Lundstrom | ................... | 360/51 |
| 7,088,534 B2 * | 8/2006 | Sutardja | ...................... | 360/51 |
| 7,133,228 B2 * | 11/2006 | Fung et al. | .................... | 360/39 |
| 2002/0168548 A1 * | 11/2002 | Sakurai et al. | ........ | 428/694 BR |
| 2004/0021971 A1 | 2/2004 | Hanson et al. | ................ | 360/51 |

(Continued)

*Primary Examiner*—Wayne R Young
*Assistant Examiner*—Dismery Mercedes
(74) *Attorney, Agent, or Firm*—Kunzler & McKenzie

(57) ABSTRACT

An apparatus, system, and method are disclosed for variable data density patterned media. The apparatus includes a patterned media recording surface comprising a plurality of sectors. Each sector may include a synchronization region configured to generate a signal in a read head, a first data region with a first data density configured to generate a signal with a first frequency, and at least a second data region with a second data density configured to generate a signal with a second frequency. The system includes a hard disk drive and the apparatus. The method includes sensing a signal in a read head, synchronizing the frequency and phase of a write clock with a predetermined frequency and phase of a synchronization region, and modifying the frequency of the write clock after a period of time determined in response to at least one physical characteristic of the disk.

19 Claims, 7 Drawing Sheets

U.S. PATENT DOCUMENTS

| | | |
|---|---|---|
| 2004/0156137 A1 | 8/2004 | Settje et al. .................. 360/51 |
| 2004/0201913 A1* | 10/2004 | Sutardja ..................... 360/51 |
| 2004/0228021 A1 | 11/2004 | Yamazaki .................... 360/51 |
| 2004/0264024 A1* | 12/2004 | Yasunaga .................... 360/31 |
| 2006/0139814 A1* | 6/2006 | Wachenschwanz et al. .. 360/317 |
| 2006/0154112 A1* | 7/2006 | Bandic et al. ............... 428/828 |
| 2007/0211368 A1* | 9/2007 | Shibano et al. ............... 360/75 |
| 2007/0258161 A1* | 11/2007 | Richter et al. ................ 360/48 |

* cited by examiner

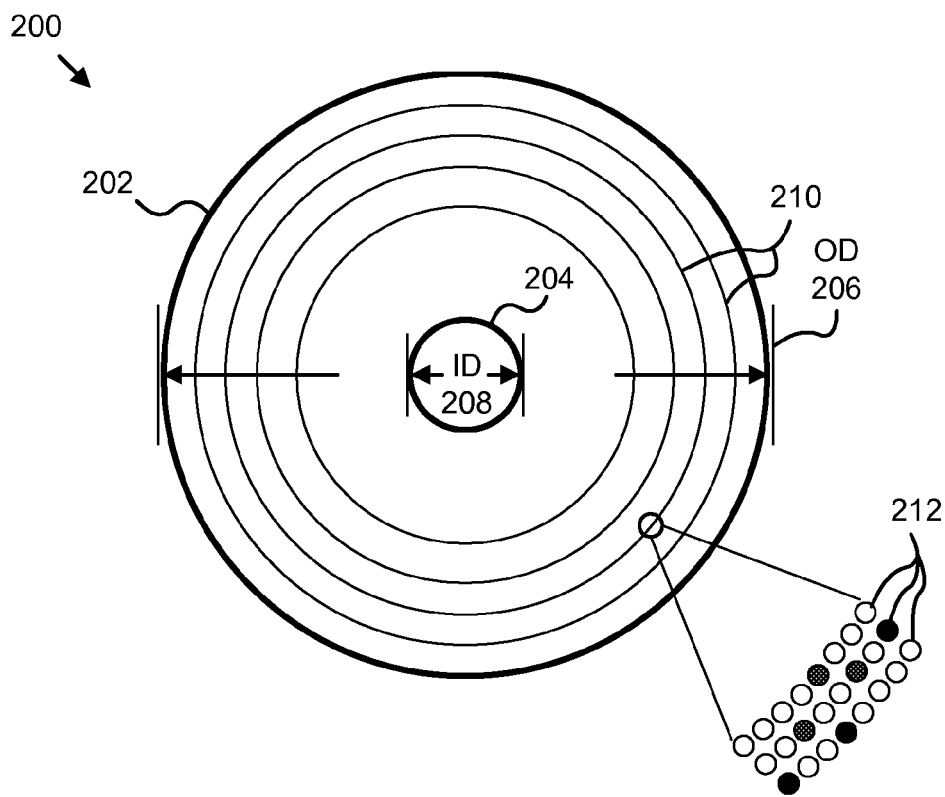
Fig. 2a    (Prior Art)
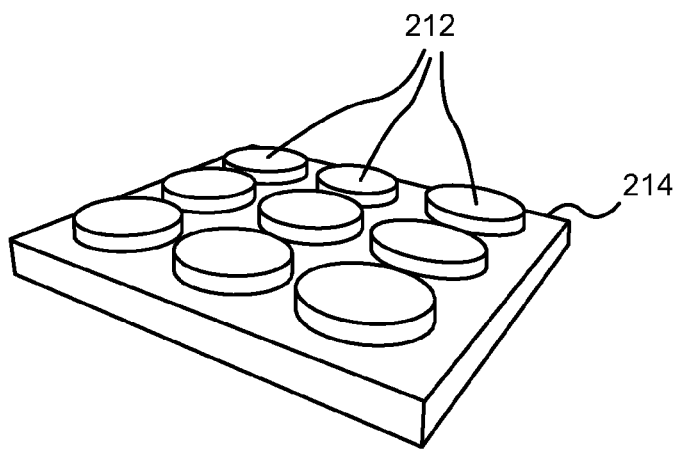
Fig. 2b

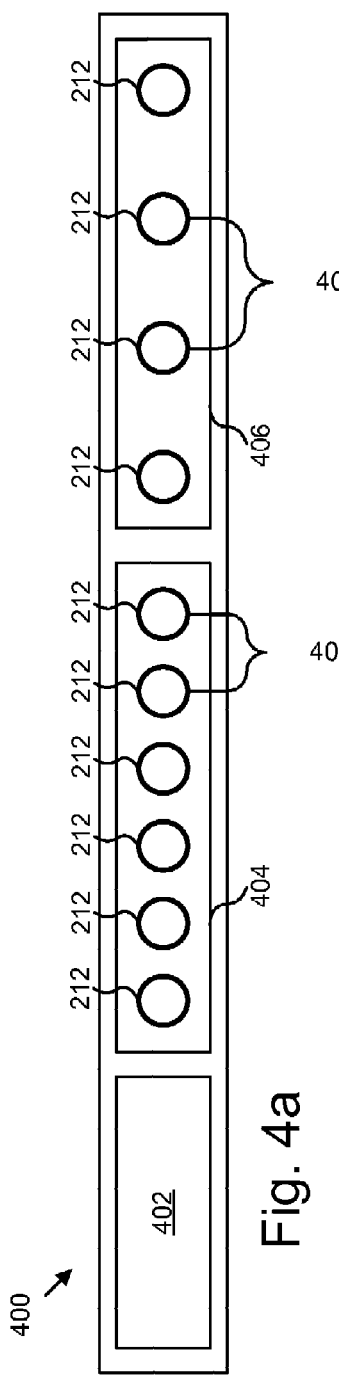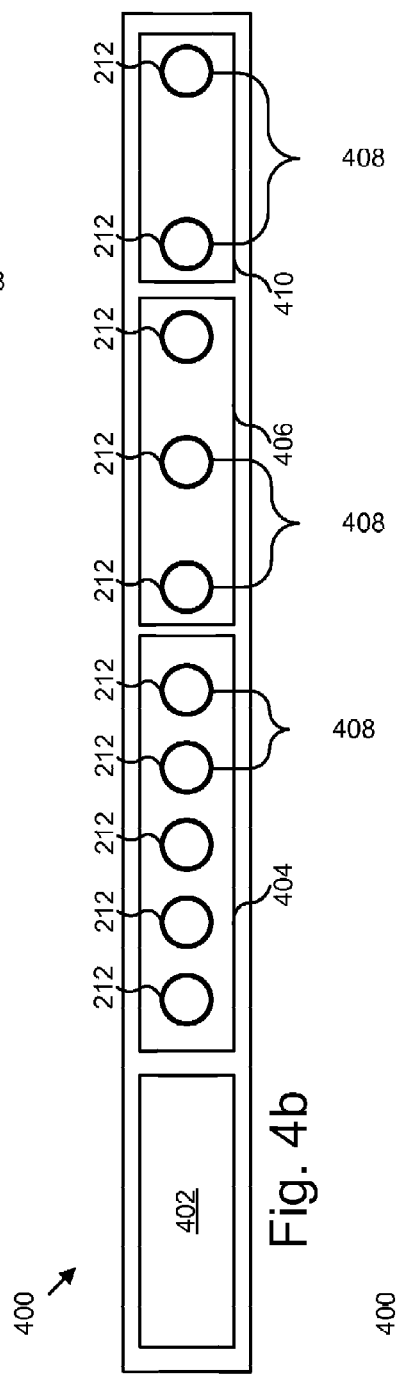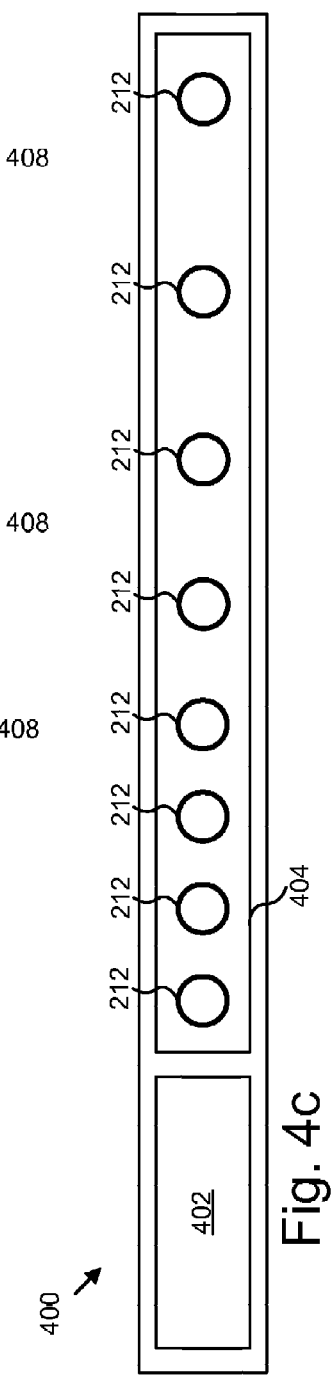

APPARATUS SYSTEM AND METHOD FOR VARIABLE DATA DENSITY PATTERNED MEDIA

BACKGROUND OF THE INVENTION

1. Field of the Invention

This invention relates to patterned media on hard disk drives and more particularly relates to variable clock rates for patterned media within a sector.

2. Description of the Related Art

Hard-disk drives provide data storage for data processing systems in computers and servers, and are becoming increasingly pervasive in media players, digital recorders, and other personal devices. Advances in hard-disk drive technology have made it possible for a user to store an immense amount of digital information on an increasingly small disk, and to selectively retrieve and alter portions of such information almost instantaneously. Particularly, recent developments have simplified hard-disk drive manufacture while yielding increased track densities, thus promoting increased data storage capabilities at reduced costs.

In a hard-disk drive, rotating high precision aluminum or glass disks are coated on both sides with a special thin film media designed to store information in the form of magnetic patterns. Electromagnetic read/write heads suspended or floating only fractions of micro inches above the disk are used to either record information onto the thin film media, or read information from it.

A read/write head may write information to the disk by creating an electromagnetic field to orient a cluster of magnetic grains in one direction or the other. Each grain will be a magnetic dipole pointing in a certain direction and also creating a magnetic field around the grain. All of the grains in a magnetic region typically point in the same direction so that the magnetic region as a whole has an associated magnetic field. The read/write head writes regions of + and − magnetic polarity, and the timing of the boundaries between regions of opposite polarity (referred to as "magnetic transitions") is used to encode the data. To increase the capacity of disk drives, manufacturers are continually striving to reduce the size of the grains.

The ability of individual magnetic grains to be magnetized in one direction or the other, however, poses problems where grains are extremely small. The superparamagnetic effect results when the product of a grain's volume (V) and its anisotropy energy ($K_u$) fall below a certain value such that the magnetization of that grain may flip spontaneously due to thermal excitations. Where this occurs, data stored on the disk is corrupted. Thus, while it is desirable to make smaller grains to support higher density recording with less noise, grain miniaturization is inherently limited by the superparamagnetic effect.

In response to this problem, engineers have developed patterned media, where the magnetic thin film layer is created as an ordered array of highly uniform islands, each island capable of storing an individual bit. Each bit may be one grain, or several exchange coupled grains, rather than a collection of random decoupled grains. In this manner, patterned media effectively reduces noise by imposing sharp magnetic transitions at well-defined pre-patterned positions, known as bit patterns. Bit patterns are organized as concentric data tracks around a disk.

A head-positioning servomechanism facilitates the ability of a read/write head to locate a particular data track location and to reposition the head from one location to another. Indexing marks and alignment indices may be recorded in arc-shaped regions of the disk surface, known as servo sectors, and referenced by the servomechanism to maintain proper dynamic positioning capabilities of the read/write head over time. Track addresses, synchronization signals, and position error signal bursts may also be recorded in servo sectors.

Disk drives using patterned media require synchronization of a write clock to the pre-patterned positions of islands along a track on the disk during writing. This synchronization is critical to ensure that the write head writes data when the write head is over an island. If the write head attempts to write data in between islands, the data will be lost. A problem arises with patterned media in that the write clock becomes out of synch with the islands over the course of normal operation.

One solution to this problem is a method called "sector synchronization." In a sector synchronization system the disk drive reads a once-per-sector synchronization feature at the beginning of each sector, locks the write clock to the correct frequency and phase, and proceeds to write data with this frequency and phase for the remainder of the sector. Unfortunately, any error in frequency due to noise in the synchronization process, or any speed variation in the disk can cause a write clock error.

The magnitude of such errors will increase as the write head proceeds from the beginning of the sector towards the end of the sector. Resynching at the beginning of the next sector eliminates this growing error. In order to compensate for the write clock becoming out of sync with the islands, the placement and spacing of the islands is carefully considered.

However, this margin of error limits the data density possible with patterned media. From the foregoing discussion, it should be apparent that a need exists for a method and apparatus with the ability to vary the clock rate of the write clock within a sector.

SUMMARY OF THE INVENTION

The present invention has been developed in response to the present state of the art, and in particular, in response to the problems and needs in the art that have not yet been fully solved by currently available patterned media devices. Accordingly, the present invention has been developed to provide an apparatus, system, and method for patterned media having variable data density that overcome many or all of the above-discussed shortcomings in the art.

The apparatus includes a disk having a patterned media recording surface comprising a plurality of sectors. Each sector may comprise a synchronization region configured to generate a signal in a read head. The signal has a predetermined frequency. The sector also includes a first data region wherein the data is positioned with a first data density configured to generate a signal with the first frequency, and at least a second data region wherein the data is positioned with a second data density configured to generate a signal with a second frequency.

In one embodiment, the first data region comprises a plurality of islands configured to maintain data. The islands may have an inter-island distance selected to generate a signal in the read head having the first frequency. Additionally, the second data region comprises a plurality of islands configured to maintain data.

In a further embodiment, the apparatus may include a plurality of data regions, each data region having a plurality of islands configured with a greater inter-island distance than a preceding data region. The apparatus may also include a write clock configured to synchronize the frequency and phase of a write clock with the predetermined frequency and phase of the synchronization region.

In one embodiment, the write clock comprises a phase-locked loop module. In another embodiment, the apparatus comprises a frequency module configured to modify the frequency of the write clock after a period of time determined in response to at least one physical characteristic of the disk. The physical characteristics may include rotational speed, number of synchronization regions, length of synchronization regions, length of data regions, and frequency of data.

A system of the present invention is also presented. In particular, the system, in one embodiment, includes a hard disk drive comprising at least one disk or platter, and the apparatus.

A method of the present invention is also presented. The method in the disclosed embodiments substantially includes the steps to carry out the functions presented above with respect to the operation of the described apparatus and system. In one embodiment, the method includes sensing a signal in a read head, the signal having a predetermined frequency, synchronizing the frequency and phase of a write clock with the predetermined frequency and phase of the synchronization region, and modifying the frequency of the write clock after a predetermined number of islands have passed under the read/write head.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2A is a schematic block diagram illustrating a plan view of a disk containing patterned magnetic media in accordance with the prior art;

FIG. 2b is a perspective view diagram illustrating a plurality of islands in accordance with the present invention;

FIG. 4a is a schematic block diagram illustrating one embodiment of a data sector in accordance with the present invention;

FIGS. 4b and 4c are schematic block diagrams illustrating alternative embodiments of the data sector in accordance with the present invention;

DETAILED DESCRIPTION OF THE INVENTION

Figure 1:
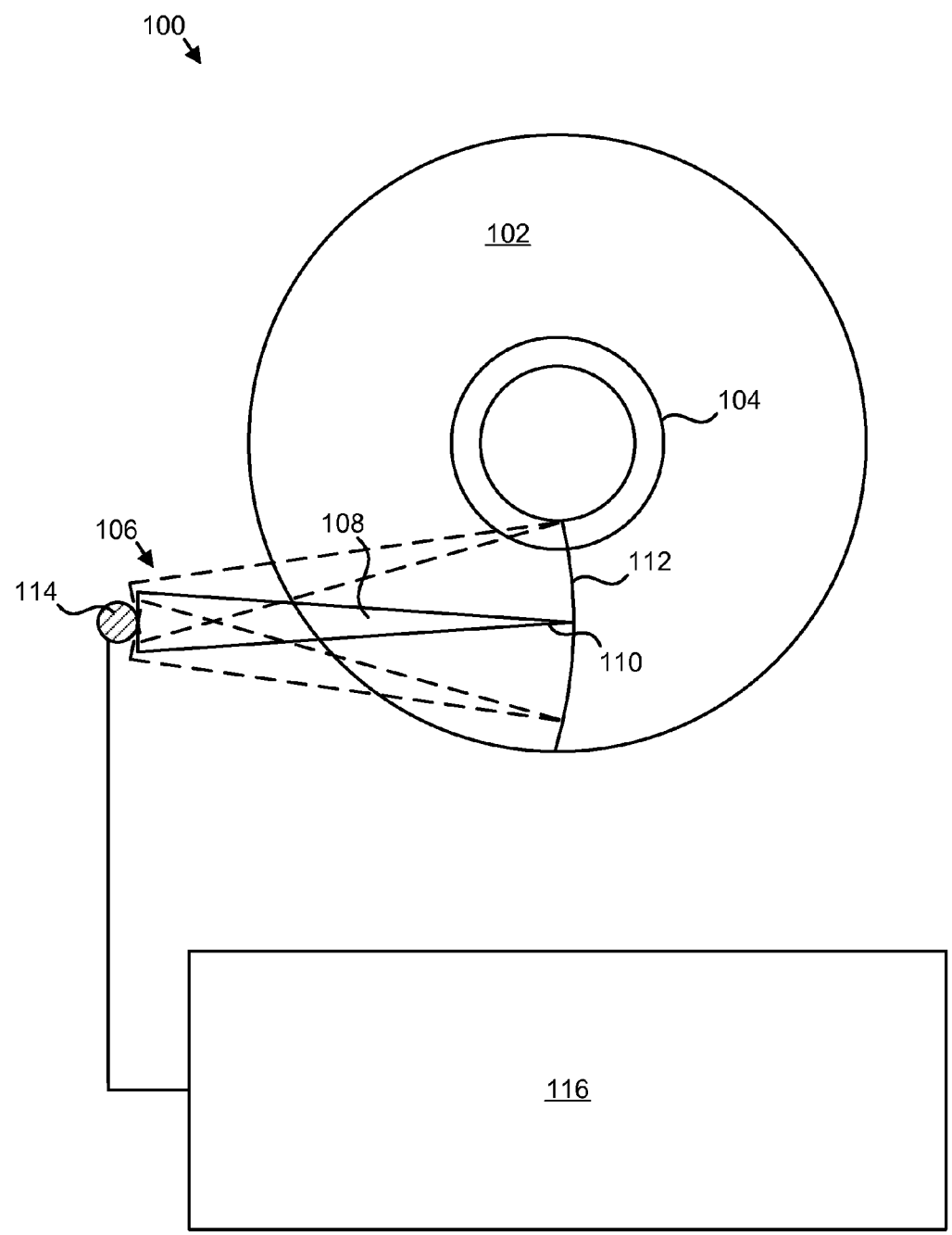
FIG. 1 is a schematic block diagram illustrating a hard-disk drive assembly in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of causing execution of a program of machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating a hard-disk drive assembly 100 in accordance with the present invention. A hard-disk drive assembly 100 generally comprises at least one of hard disk 102, rotated at high speeds by a spindle motor (not shown) during operation. Concentric data tracks 104 formed on either or both disk surfaces receive and store magnetic information.

A read/write head 110 may be moved across the disk surface by an actuator assembly 106, allowing the head 110 to read or write magnetic data to a particular track 104. The actuator assembly 106 may pivot on a pivot 114. The actuator assembly 106 may form part of a closed loop feedback system, known as servo control, which dynamically positions the read/write head 110 to compensate for thermal expansion of the disks 102 as well as vibrations and other disturbances. Also involved in the servo control system is a complex computational algorithm executed by a control module 116. The control module may comprise a microprocessor, digital signal processor, or analog signal processor that receives data address information from an associated computer, converts it to a location on a disk 102, and moves the read/write head 110 accordingly.

Specifically, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 104 to another. Upon referencing a servo pattern, the read/write head 110 obtains head position information that enables the control module 116 to subsequently re-align the head 110 to correct any detected error.

Servo patterns may be contained in engineered servo sectors 112 embedded within a plurality of data tracks 104 to allow frequent sampling of the servo patterns for optimum disk drive performance. In a typical hard disk 102, embedded servo sectors 112 extend substantially radially from the disk 102 center, like spokes from the center of a wheel. Unlike spokes however, servo sectors 112 form a subtly arc-shaped path calibrated to substantially match the range of motion of the read/write head 110.

FIG. 2A is a schematic block diagram illustrating a plan view of a disk 200 containing patterned magnetic media in accordance with the prior art. The disk 200 includes a circular outside edge 202, a central opening 204, an outside diameter (OD) 206, an inside diameter (ID) 208, tracks 210, and data recording bits 212.

Each track 210, which is a ring on the disk 200 where data can be written, is used to identify where information is stored. A track 210 of patterned magnetic media generally comprises a number of highly uniform islands 212. Each island is capable of storing an individual data recording bit that corresponds to a binary digit.

Electromagnetic read/write heads suspended or floating only fractions of micro inches above the disk 200 are used to either record information onto a magnetic layer or read information from it. In certain embodiments, the read/write head flies just a nanometer above the surface of the disk 200. Consequently, precision and substrate integrity are essential to achieve quality data throughput.

A read/write head may write information to the disk 200 by creating an electromagnetic field to orient a bit on an island 212, in one direction or the other. To read information, magnetic patterns detected by the read/write head are converted into a series of pulses which are sent to the control module 116 to be converted to binary data and processed by an attached computing system (not shown).

Patterned media with isolated islands 212 enables the bit size to be reduced without causing instability known as the superparamagnetic effect. In conventional multigrain magnetic media, for example, bits are generally created by covering a flat substrate with a thin layer of magnetic alloy, which comprises formed clusters of atoms on the substrate surface known as grains. Each grain operates as a partially independent unit of magnetization subject to influence from other grains. Data stored in tracks 210 is comprised of regions of alternating magnetic polarity.

Manufacturers of conventional hard disk drives employ many tactics to increase storage density. For example, tracks may be made narrower, or the length of the regions of alternating polarity along the track may be reduced. Shrinking these dimensions generally requires that the size of the random grains in the media be reduced, so that sharp boundaries and sharp track edge boundaries can be defined by the magnetic write head. If grains are too large, the signal to noise ratio of the recording system suffers, and data errors are generated at an unacceptable rate. On the other hand, if the grains are too small, they may become unstable from thermally induced vibrations and spontaneously reverse their magnetic polarity (leading to loss of stored data). As a result of the superparamagnetic effect, the areal density of stable conventional hard disk drives has typically been restricted to around 150 Gbit/in$^2$ for conventional multigrain magnetic recording media.

One benefit of patterned media is the ability to overcome the above described superparamagnetic effect. Forming islands 212 on the substrate of the disk 200 increases the storage capacity and reduces the risk of losing data due to magnetic grain instability.

Due to their physical separation and reduced magnetic coupling to one another, the magnetic islands 212 function as individual magnetic units, comprised either of single grains or a collection of strongly-coupled grains within each island. Since these magnetic islands 212 are typically larger than the individual grains in conventional media, their magnetization is thermally stable.

FIG. 2b is a perspective view diagram illustrating a plurality of islands 212 in accordance with the present invention. As used herein, the term "island" refers to an isolated magnetic region. The "islands," in addition to comprising an isolated magnetic region, may also have a physical appearance that is similar to an island. For example, in one embodiment, the islands 212 may protrude outward from the substrate 214. As described above, each island 212 is configured to store one data recording bit.

The islands 212 may be formed in the substrate 214 using varying manufacturing processes, including but not limited to, stamping and ion beam patterning. Stamping utilizes a thin polymer film that has been "stamped" with 50 nm or smaller features. The stamped polymer film then serves as an etch mask during a substrate etching process. Another approach is ion beam modification of magnetic layers. The islands 212 may be printed either through a resist mask or through an open stencil mask. Ion beam patterning may be used to produce patterned magnetic regions. Further discussion of island 212 forming techniques will not be given herein as one skilled in the art will recognize that many different methods exist to form islands 212 in accordance with the present invention.

Figure 3:
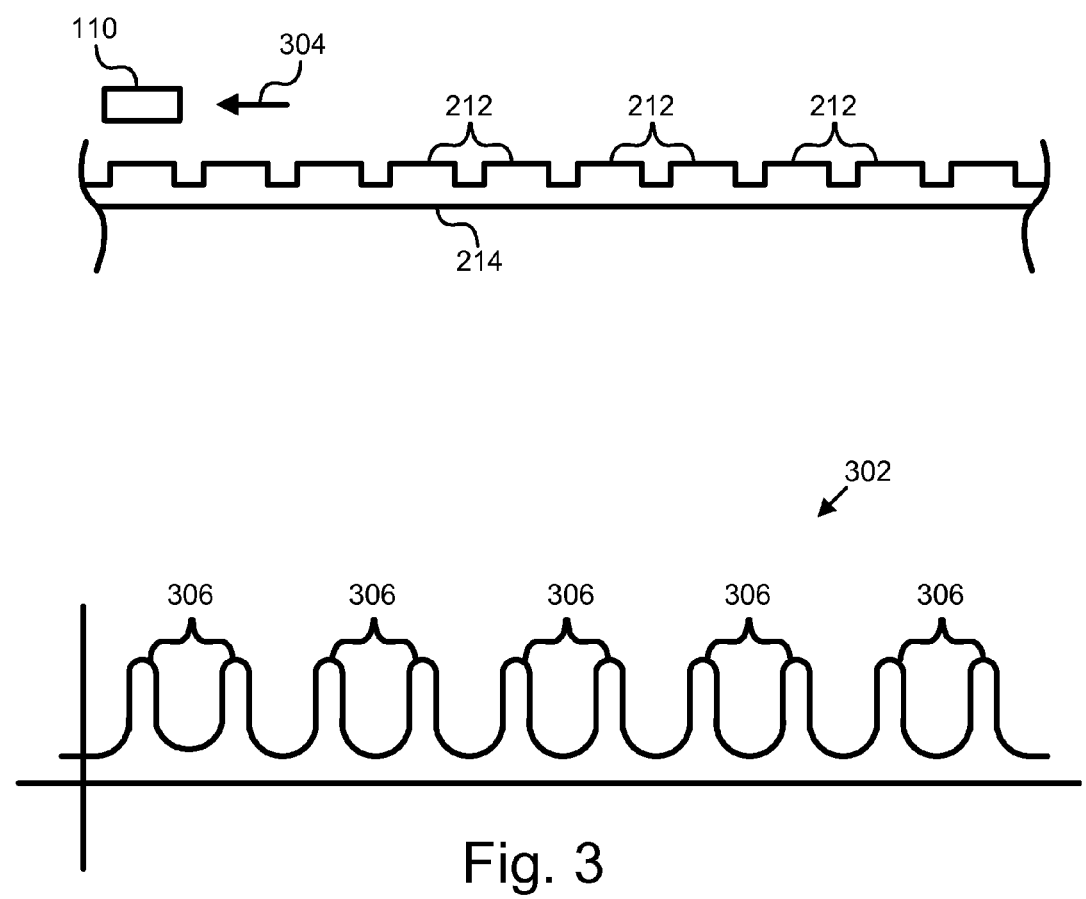
FIG. 3 is a schematic block diagram illustrating a cross sectional view of a substrate and islands and a representative signal in accordance with the present invention.

FIG. 3a is a schematic block diagram illustrating a cross sectional view of a substrate 214 and islands 212 and a representative signal 302 in accordance with the present invention. In one embodiment, the islands 212 pass under the read/write head (hereinafter "head") 110 as the spindle motor spins the disk or platter. Arrow 304 indicates the direction in which the islands 212 are moving with respect to the head 110. The head 110 is configured to detect the magnetic field of each island 212 and communicate the presence of the magnetic field with the control module 116 of FIG. 1.

In one embodiment, the presence of an island 212 having a magnetic field is indicated by a peak 306 of the signal 302. The magnetic field of each island 212 produces a signal in the head 110 which may be illustrated as a wave 302. As with any wave-like signal, the signal 302 may be described in terms of frequency and phase. The frequency of the signal is a result of the data density and speed of the islands 212 with respect to the head 110.

The phase of the signal 302 relates the position of a peak 306 with the peak of another signal. The phase may be measured as a time, distance, a fraction of the wavelength, or as an angle. For example, the control module 116 ideally maintains a clock having an identical frequency and phase as the signal 302 generated by the islands 212.

The head 110 produces a high magnetic field region referred to as a "write bubble." An island 212 within the write bubble is oriented with the magnetic field of the write bubble. As the write bubble passes by an island 212, the polarity of the field in the write bubble at the moment the island passes out of the bubble is permanently "frozen" into the island. The clock determines when it is appropriate for the head 110 to reverse the polarity of the write bubble. Unfortunately, due to noise during the synchronization process, or any speed variation in the disk the clock can become "out of phase" with the signal 302 and cause a write clock phase error. The magnitude of the write clock phase error may grow as the head 110 proceeds.

The head 110 need not be 180 degrees out of phase (i.e. attempting to write between islands) to produce write errors, the data error rate can be affected by phase errors on the order of 10% of clock period or greater are generally fatal. The tolerance of the writing process with the timing of the clock is governed in part by the linear density of the islands 212 along a track. For example, if the spindle speed varies such that the linear distance traveled since the last sync pattern has an uncertainty of 3 nm by the end of a data sector, this represents a 10% phase error if the island 212 spatial period is 30 nm. As used herein, the term "period" refers to the spacing or distance from one island to the next island 212. Alternatively, the term "period" may refer to the center-to-center distance of neighboring islands. Referring again the above example, if the spatial period of the island is 40 nm, the phase error is 7.5%. Since the probability of incorrect writing depends strongly on the % phase error, lowering the linear density reduces the phase error.

Two major contributors to write-clock phase error are frequency error in the sync process of the clock (often caused by noise in the reading a sync pattern) and spindle speed variation during the passing of the data sector. Both of these cause a cumulative phase error that tends to increase along the data sector.

FIG. 4a is a schematic block diagram illustrating one embodiment of a data sector 400 in accordance with the present invention. The present invention beneficially overcomes the above described shortcoming by utilizing variable data densities in order to reduce the phase error. In one embodiment, the data sector 400 comprises a synchronization region 402, a first data region 404 and a second data region 406.

The synchronization region 402, or synch burst, is a region configured to generate a signal in the head 110 having a predetermined frequency. The synchronization region 402 may comprise a single frequency sync burst or in other terms a row of islands with constant spacing corresponding to the write clock. Furthermore, the synchronization region 402 may comprise any type of pattern from which the exact rotational speed and angular position of the disk can be determined. The first data region 404 comprises a plurality of islands 212 having an inter-island spacing configured to generate a signal having the predetermined frequency when the islands 212 pass under the head 110 at a predetermined speed. The speed is generally fixed by the manufacturer of the hard disk drive.

As described above, the write phase error is reduced by lowering the linear density of data. As such, in one embodiment, the sector 400 may include a second data region 406 having an increased period or spacing 408. Lowering the linear density of the region may be accomplished by increasing the inter-island distance, increasing the length of an island, or a combination of both. In the depicted embodiment, the sector 400 comprises two data regions, each region having a constant spacing 408.

FIGS. 4b and 4c are schematic block diagrams illustrating alternative embodiments of the data sector 400 in accordance with the present invention. In one embodiment, the sector 400 may comprise a plurality of data regions. As depicted, the sector 400 includes a first 404, a second 406, and a third 410 data region. Each subsequent region 406, 410, following the first region 404, is configured with a greater inter-island distance or period 408 than the preceding region.

In a further embodiment, the sector may comprise any number of data regions deemed necessary to reduce the phase error. In one example, each region may comprise a single island. FIG. 4c illustrates one embodiment of a sector 400 having only one data region 412. The data region 412 may be configured with a plurality of islands 212 where the period continuously increases in order to compensate for the write-clock phase error.

Figure 5:
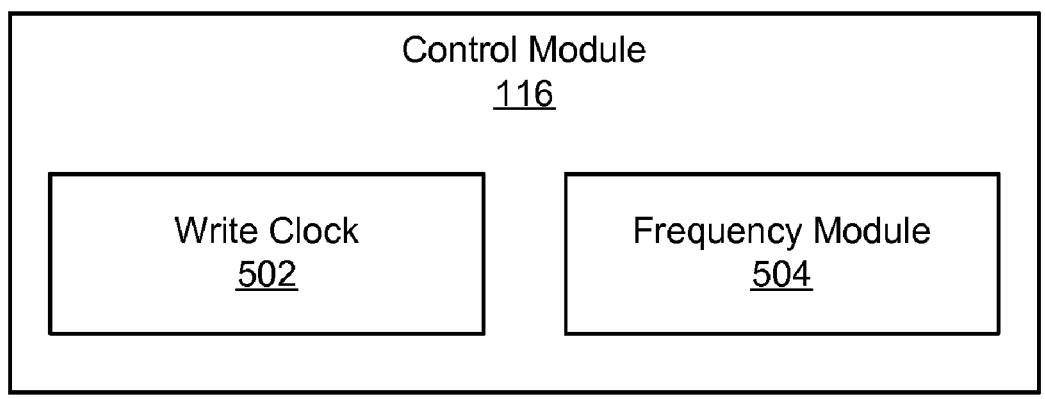
FIG. 5 is a schematic block diagram illustrating one embodiment of a control module in accordance with the present invention.

FIG. 5 is a schematic block diagram illustrating one embodiment of a control module 116 in accordance with the present invention. In one embodiment, the control module 116 comprises a write clock 502 and a frequency module 504. The write clock 502 is configured to synchronize the frequency and phase of the head 110 with the predetermined frequency and phase of the synchronization region. In one embodiment, the write clock 502 may comprise a phase-locked loop module.

A phase locked loop module is a component that generates an output clock by synchronizing itself to an input clock. With regard to the present invention, the input is provided by the synchronization region, and the output is used by the head 110 to set the correct frequency and phase for the write clock. Alternatively, the write clock 502 may utilize other components for synching with synchronization region. For example, the write clock 502 may comprise a direct digital synthesis module, crystal oscillators, and the like. Furthermore, the write clock 502 may comprise any type of circuit that is capable of locking the phase and frequency of the circuit output to information derived from the synchronization region. In a further embodiment, the write clock 502 maintains the "clock" and resynchronizes the clock each time a synchronization region passes under the head 110.

The frequency module 504 is configured to modify the frequency of the head after a period of time to coincide with the varying linear data density. The predetermined time may be selected in response to at least one physical characteristic of the disk. The physical characteristics may include rotational speed, number of synchronization regions, length of synchronization regions, length of data regions, and frequency of data or data density.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
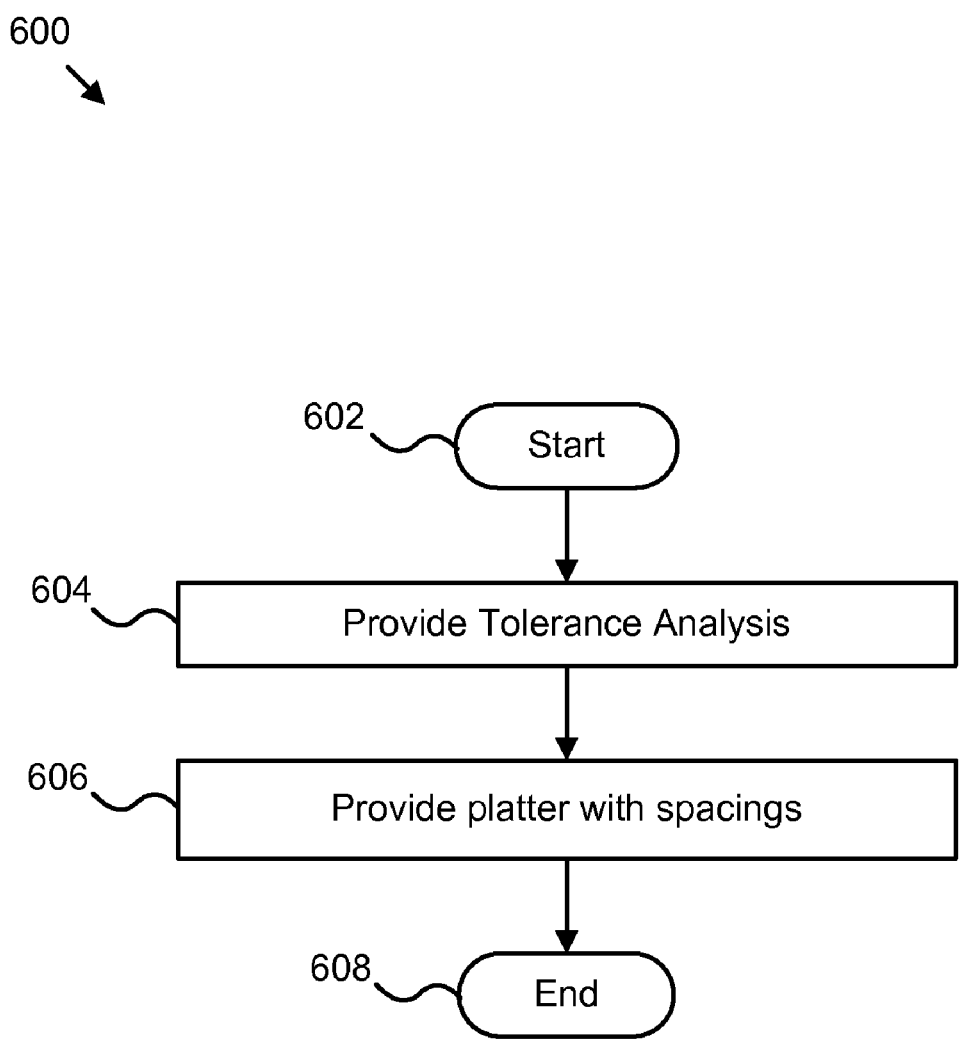
FIG. 6 is a schematic flow chart diagram illustrating one embodiment of a method for determining optimal linear densities in accordance with the present invention.

FIG. 6 is a schematic flow chart diagram illustrating one embodiment of a method 600 for determining optimal linear densities in accordance with the present invention. In one embodiment, the method 600 starts 602 and a tolerance analysis is provided 604. The tolerance analysis may be performed by the manufacturer of the hard disk drive. The tolerance analysis will determine how phase errors accumulate within a sector. For example, if phase errors due to spindle acceleration and other sources are known to be small compared to phase errors due to clock frequency errors from noise in the write clock, then the phase errors accumulate linearly throughout the sector on a statistical basis. In this example, in order to maintain a phase error at the end of a second data region equal to that at the end of a first data region, the linear density of the second data region should be half of the first data region.

Once the optimal density is determined, the disks or platters are provided 606 with the optimal data densities. The manner of manufacture was described above with reference to FIGS. 2a and 2b. The method 600 then ends 608.

Figure 7:
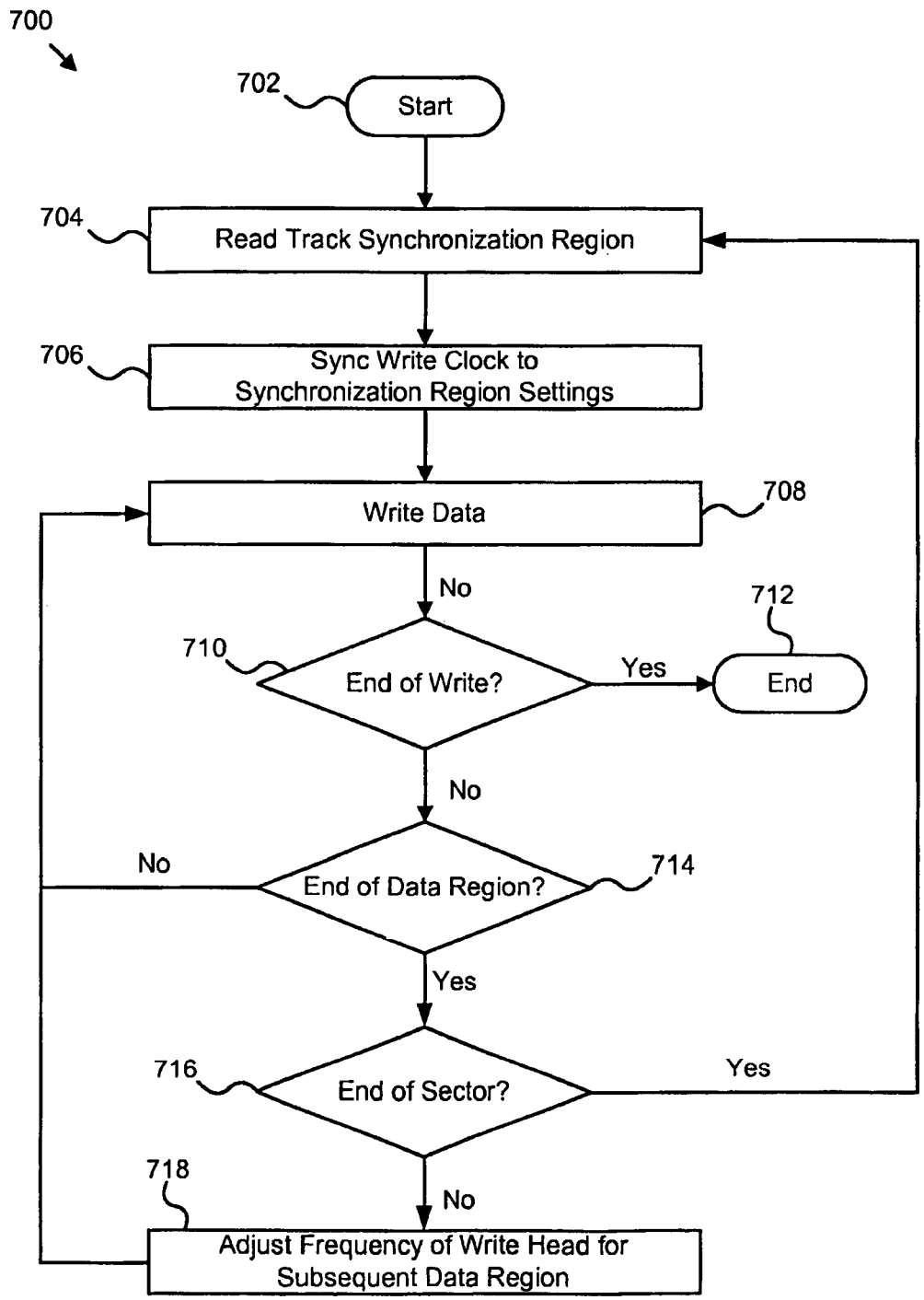
FIG. 7 is a schematic block diagram illustrating one embodiment of a method for writing data to a disk having variable data densities in accordance with the present invention.

FIG. 7 is a schematic block diagram illustrating one embodiment of a method 700 for writing data to a disk having variable data densities in accordance with the present invention. In one embodiment, references to "writing" and "reading" data refer to writing and reading entire data sectors and/or entire sequential data sectors. Alternatively, "writing" and "reading" may refer to writing and reading partial sectors. The method 700 starts 702 and the head 110 reads 704 the synchronization region on the disk. In one embodiment, reading 704 the synchronization region comprises identifying the frequency and phase of the synchronization region. The write clock 502 then synchronizes 706 the clock with synchronization region. As described above, synching 706 the clock with the synchronization region may comprise a phase-locked loop module synchronizing the input signal with the clock.

In one embodiment, the head 110 then writes 708 data to the disk. If the write operation is small and the write operation is finished 710, the method 700 ends 712. Alternatively, the write operation continues until the end of the data region is reached 714. If the head 110 reaches 714 the end of the data region (first or any subsequent data region) and the head 110 has not reached 716 the end of the sector, the frequency module 504 adjusts 718 the frequency of the clock for the subsequent data region. The head 110 then continues writing data 708 as described.

If, however, the write operation does not fit within one sector, and the head 110 reaches 716 the end of the sector, the head 110 temporarily pauses the write operation and reads 704 the next synchronization region. Accordingly, the write clock 502 resynchronizes 706 the clock in order to compensate for any cumulative write clock phase error. The method 700 then continues as described until the write operation 710 and subsequently the method 700 end.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for patterned media having variable data density, the apparatus comprising:
a disk having a patterned media recording surface comprising a plurality of sectors;
wherein each sector comprises
a synchronization region configured to generate a signal in a read head, the signal having a predetermined frequency, the signal indicating a speed of the sector in relation to a write head;
a first data region wherein the data is positioned with a first data density configured to generate a signal with a first frequency; and
at least a second data region positioned to place the first data region between the synchronization region and the at least one second data region, wherein the data comprising the second data region is positioned with a second data density configured to generate a signal with a second frequency, wherein the second data density is less than the first data density to compensate for a cumulative phase error in a write head.

2. The apparatus of claim 1, wherein the first data region comprises a plurality of islands configured to maintain data, and wherein the islands have an inter-island distance selected to generate a signal in the read head having the first frequency.

3. The apparatus of claim 1, wherein the second data region comprises a plurality of islands configured to maintain data, and wherein the islands have an inter-island distance configured to generate a signal in the read head having the second frequency.

4. The apparatus of claim 1, further comprising a plurality of data regions, each data region having a plurality of islands configured with a greater inter-island distance than a preceding data region.

5. The apparatus of claim 1, further comprising a write clock configured to synchronize with the predetermined frequency and a phase of the synchronization region.

6. The apparatus of claim 5, wherein the write clock comprises a phase-locked loop module.

7. The apparatus of claim 5, further comprising a frequency module configured to modify the frequency of the write clock after a period of time determined in response to at least one physical characteristic of the disk.

8. The apparatus of claim 7, wherein the physical characteristic is selected from a group consisting of number of islands passed, rotational speed, number of synchronization regions, length of synchronization regions, length of data regions, and frequency of data.

9. A system for patterned media having variable data density, the system comprising:
a write head configured to write information by creating a magnetic field to orient a bit in one direction or the other;
a hard disk drive comprising at least one disk;
the disk having a patterned media recording surface comprising a plurality of sectors;
wherein each sector comprises
a synchronization region configured to generate a signal in a read head, the signal having a predetermined frequency and phase;
a first data region wherein the data is positioned with a first data density configured to generate a signal with a first frequency;
at least a second data region positioned to place the first data region between the synchronization region and the at least one second data region, wherein the data comprising the second data region is positioned with a second data density configured to generate a signal with a second frequency, wherein the second data density is less than the first data density compensate for a cumulative phase error to the write head;
a write clock configured to synchronize a frequency and phase of the write head with the predetermined frequency and a phase of the synchronization region; and
a frequency module configured to modify the frequency of the write clock after a period of time determined in response to at least one physical characteristic of the disk.

10. The system of claim 9, wherein the first data region comprises a plurality of islands configured to maintain data, and wherein the islands have an inter-island distance selected to generate a signal in the read head having the first frequency.

11. The system of claim 9, wherein the second data region comprises a plurality of islands configured to maintain data, and wherein the islands have an inter-island distance configured to generate a signal in the read head having the second frequency.

12. The system of claim 9, further comprising a plurality of data regions, each data region having a plurality of islands configured with a greater inter-island distance than a preceding data region.

13. The system of claim 9, wherein the write clock comprises a phase-locked loop module.

14. The system of claim 9, wherein the physical characteristic is selected from a group consisting of number of islands passed, rotational speed, number of synchronization regions, length of synchronization regions, length of data regions, and frequency of data.

15. A computer readable storage medium encoded with a computer readable program, wherein the computer readable program when executed on a computer causes the computer to:

sense a signal in a read head, the signal having a predetermined frequency identifying a first frequency and a second frequency, the first frequency resulting from a first density of a first data region, the second frequency resulting from a second density of a second data region, wherein the second data density is less than the first data density compensate for a cumulative phase error to a write head;
synchronize a frequency and a phase of a write clock with a predetermined frequency and phase of a synchronization region; and
modify the frequency of the write clock after a period of time determined in response to at least one physical characteristic of the disk.

16. The computer readable medium of claim 15, wherein the computer readable program causes the computer to select a physical characteristic from a group consisting of rotational speed, number of synchronization regions, length of synchronization regions, length of data regions, and frequency of data.

17. A method for writing patterned media having variable data density, the method comprising:
sensing a signal in a read head, the signal having a predetermined frequency identifying a first frequency and a second frequency, the first frequency resulting from a first density of a first data region, the second frequency resulting from a second density of a second data region, wherein the second data density is less than the first data density compensate for a cumulative phase error to a write head;
synchronizing a frequency and phase of a write clock with the predetermined first frequency and a phase of a synchronization region;
modifying the frequency of the write clock after a period of time determined in response to at least one physical characteristic of the disk; and
writing the patterned media with the write head.

18. The method of claim 17, wherein the method comprises selecting a physical characteristic from a group consisting of number of islands passed, rotational speed, number of synchronization regions, length of synchronization regions, length of data regions, and frequency of data.

19. An apparatus for patterned media having variable data density, the apparatus comprising:
means for sensing a signal in a read head, the signal having a predetermined frequency identifying a first frequency and a second frequency, the first frequency resulting from a first density of a first data region, the second frequency resulting from a second density of a second data region, wherein the second data density is less than the first data density compensate for a cumulative phase error to a write head;
means for synchronizing a frequency and phase of a write clock with the predetermined frequency and a phase of a synchronization region; and
means for modifying the frequency of the write clock after a period of time determined in response to at least one physical characteristic of the disk.

* * * * *